United States Patent

[11] 3,615,918

| [72] | Inventors | James D. Evans;<br>David W. Taylor, both of Middletown, Ohio |
|---|---|---|
| [21] | Appl. No. | 811,658 |
| [22] | Filed | Mar. 28, 1969 |
| [45] | Patented | Oct. 26, 1971 |
| [73] | Assignee | Armco Steel Corporation<br>Middletown, Ohio |

[54] METHOD OF ANNEALING WITH A MAGNESIA SEPARATOR CONTAINING A DECOMPOSABLE PHOSPHATE
8 Claims, No Drawings

[52] U.S. Cl. .................................................. 148/113,
117/129, 117/135.1, 117/169, 148/6.15, 148/12.1,
148/14, 148/31.55
[51] Int. Cl. ........................................ H01f 1/18,
B22b 15/18
[50] Field of Search ........................................ 148/110,
111, 112, 113, 6.15, 31.5, 31.55, 12.1, 14;
117/169 A, 129, 135.1

[56] References Cited
UNITED STATES PATENTS

| 2,790,739 | 4/1957 | Frederick et al. | 148/6.15 |
|---|---|---|---|
| 2,920,296 | 1/1960 | Neurath | 148/113 UX |
| 2,980,561 | 4/1961 | Ford et al. | 148/6.15 |
| 3,144,364 | 8/1964 | Robinson et al. | 148/113 |
| 3,151,000 | 9/1964 | Schmidt et al. | 148/113 |
| 3,198,674 | 8/1965 | Huppke | 148/31.5 X |
| 3,213,302 | 10/1965 | Barney | 148/6.15 X |
| 3,214,302 | 10/1965 | Brodt et al. | 147/6.15 |

FOREIGN PATENTS

| 469,023 | 10/1950 | Canada | 148/113 |
|---|---|---|---|

*Primary Examiner*—L. Dewayne Rutledge
*Assistant Examiner*—G. K. White
*Attorney*—Melville, Strasser, Foster & Hoffman

ABSTRACT: An annealing separator for magnetic materials, such as oriented silicon steel and the like, consisting essentially of magnesium oxide and/or hydroxide with an addition of a decomposable phosphate compound. The phosphate addition, which may be in the form of an inorganic phosphate, may be added to the magnesium oxide and/or hydroxide in such amounts as to produce a $P_2O_5$ content on the order of 1–25 percent by weight of the total coating. Preferably, the $P_2O_5$ will be present in an amount of at least 1 percent, and up to about 15 percent. A magnetic material processed according to standard procedures and coated with said composition prior to a final high temperature anneal, will yield a product having an improved glass film.

METHOD OF ANNEALING WITH A MAGNESIA SEPARATOR CONTAINING A DECOMPOSABLE PHOSPHATE

BACKGROUND OF THE INVENTION

This invention relates to an annealing separator for silicon steel, which separator consists essentially of magnesium oxide with additions of a decomposable phosphate compound. Additionally, the invention covers the method annealing with said separator to prevent contiguous portions of the steel from being welded together, and to produce a continuous insulating film on the annealed steel.

In the production of electrical devices such as transformers and the like, it is often desirable to produce an insulating coating on the surface of the steel. Such coatings are well known in the art and may comprise the reaction product between the elements of the steel and the applied coating. For example, when magnesium oxide is applied to the surfaces of silicon steel, a subsequent high temperature anneal will result in the formation of a glass film composed principally of magnesium silicate on the surface thereof. Silica in the surface of the steel combines with the magnesium oxide to form magnesium-silicate glass. Unfortunately, it was not possible to fully control the glass film formation by the prior art procedures.

In copending application, Ser. No. 663,543, and now U.S. Pat. No. 3,544,396 entitled "SILICON STEEL COATED WITH MAGNESIA CONTAINING CHROMIC OXIDE," by one of the inventors herein, there is taught a procedure whereby chromic oxide is added to the magnesia as a means to produce additional silica for better control of the glass film formation. The present invention has certain advantages over the chromic oxide treatment, including the use of less costly coating additives and the ability to control the weight of coating visually. The chromic oxide containing coating has a green appearance prior to the final anneal making it difficult to judge the coating weight, whereas phosphate additives do not color the coating.

Before the development in said copending application which teaches modifications to the annealing separator, the prior art depended upon strip decarburization in wet hydrogen atmospheres for the formation of silica on the silicon steel surface. It is believed that some additional silica is formed during the high temperature anneal by the release of water and carbon dioxide from the annealing separator. During the high temperature anneal this silica also combines with the annealing separator producing a magnesium silicate glass film.

For convenience, reference may be made to said copending application for a more detailed review of the problems which challenged the practitioner in this art. In brief, the problem is a dual one. With the formation of a discontinuous insulating film, an "oxide pattern" or discoloration frequently develops after the final anneal. Additionally, there is a tendency for the steel to become contaminated during subsequent anneals, such as practiced by a fabricator at its plant.

It has been discovered that by the use of phosphate compounds as additives to the annealing separator, for controlled oxidation of additional silicon during the high temperature box anneal, it is possible to produce less expensively a glass film that is uniform and continuous throughout. Said film has been found to resist formation of the "oxide border" and, because of the continuity of the film, protects the steel from contamination by carbon during the stress relief anneal.

From the discussion above, reference has been made to the formation of a glass film by the reaction of the coating with the elements of the steel. In other words, the formation of a silicate glass requires the presence of silicon in the steel. Therefore, for a full appreciation of the description to follow, it is intended that the term "electrical steel" or "silicon steel" relates to an alloy whose typical composition by weight percent falls within the following:

Carbon    0.050% Max.
Silicon   2-4%
Sulfur or Selenium   0.03% Max.
Manganese   0.02-0.4%
Aluminum   0.04% Max.
Iron   balance

SUMMARY OF THE INVENTION

According to the present invention, silicon steel is processed according to a procedure which may include hot reduction of steel stock into strip form, pickling, annealing, at least one cold reduction to final gauge, decarburization, and a final box anneal. Prior to the final box anneal, the silicon steel is coated with a glass-forming magnesium oxide separator to which has been added additions of a decomposable phosphate compound. Compounds found suitable for the practicing of this invention may be listed as follows:
1. Phosphoric acid
2. Calcium phosphate
3. Aluminum phosphate
4. Magnesium phosphate
5. Ammonium phosphate A silicon steel processed according to the above will exhibit a glass film which is uniform and continuous throughout the strip.

DESCRIPTION OF THE PREFERRED EMBODIMENT

For purposes of an exemplary showing, the annealing separators taught herein will be described with respect to their application to the silicon steel sheet stock prior to the final anneal thereof, and hence prior to the development of the final magnetic properties of the stock.

The magnesia separator referred to herein will be understood to comprise magnesia which has been either partially or completely hydrated to magnesium hydroxide. In the preferred embodiment of the present invention, magnesia is applied to the silicon steel in a water slurry, forming a dried coating having not more than 12 percent combined water, as taught in U.S. Pat. No. 2,906,645, in the name of Carpenter et al.

During the final anneal, the magnesia separator serves several functions. It prevents the sticking of adjacent sheets or contiguous convolutions of the silicon steel, it promotes some desulfurization of the steel, and it reacts with the steel to form a magnesium silicate or glass coating on the stock surface. It has been discovered that additions of a decomposable phosphate compound to the magnesia separator tend to improve the properties of the surface glass on the final product and the magnetic properties of the final product without interfering with the other functions of the magnesia separator.

While not desiring to be governed by any theory, it is believed that these phosphate compounds are reduced during the high temperature box anneal producing elemental phosphorus, which diffuses harmlessly and homogeneously into the silicon steel. Silicon in the steel is oxidized coincident with the reduction of the phosphate to produce silica which combines with magnesia to form magnesium-silicate glass. The resulting glass film is generally oxidation-resistant and continuous throughout the strip thereby minimizing the changes of contamination by a stress relief anneal.

It will be appreciated from reading this description that there are many factors which enter into the selection and quantity of the decomposable phosphate compound added to the magnesium oxide. While not attempting to be limiting, such factors as coating weight, type and source of the coating ingredients, preprocessing and postprocessing steps, have been found to influence the quantity of additive necessary to yield the optimum results. However, it is believed that from the description to follow, one skilled in the art will be able to determine with a minimum of effort the parameters for producing the claimed glass film.

Coating thicknesses or weights are generally expressed in oz./ft.$^2$ sheet. For convenience, therefore, the further description will be based upon the production of a coating thickness on the order of 0.03 oz./ft.$^2$ sheet. However, it should be understood that variations in coating weight are possible and accordingly are contemplated in this invention.

Further, since the critical feature of the decomposable phosphate compound additive is the quantity of phosphate available for reaction during the high temperature anneal, the addition will be expressed as the percentage of $P_2O_5$, or its equivalent.

Based upon the preceding considerations, the $P_2O_5$ should constitute from 1 to 25 percent of the total weight of the dried magnesia separator. Under commercial conditions such as a continuous decarburization and a tight coil anneal, it may be desirable to restrict the maximum quantity to 5 percent. At the other extreme, where the silicon steel is processed under isolated conditions, such as found in the laboratory or in annealing narrow width cores, an increase in the available $P_2O_5$ is possible. For example, the preferred range would be from 5 to 15 percent. Within these ranges, the following decomposable phosphate compounds have been found suitable to give the desired continuous glass film, when applied to silicon steel and annealed at a temperature on the order of 2,200° F. The additives are phosphoric acid, calcium phosphate, aluminum phosphate, magnesium phosphate, and ammonium phosphate. It is acknowledged that some of these compounds names are generic to a family of compounds such that it is contemplated that each said member is included.

While it may be evident from the above discussion why minimum limits have been imposed on the additives, it has been determined that large amounts of available $P_2O_5$ tend to produce a roughened glass film-iron interface caused by excessive oxidation. This result had a deleterious effect on the resistivity of the insulating glass film.

Certain ancillary benefits have been found to reside in the use of this invention. For example, as indicated previously, the phosphate compounds are reduced during the high-temperature-box anneal producing elemental phosphorus which diffuses harmlessly and homogeneously into the silicon steel. The silicon in the steel is oxidized coincident with the reduction of the phosphate compound to produce silica which combines with the magnesium oxide to form magnesium-silicate glass. It is known that calcium oxide in the magnesia facilitates the removal of sulfur from the steel during the high-temperature anneal. Unfortunately the hydrated calcium oxide in the slurry tends to react with $CO_2$ to form the carbonate which decomposes during the high-temperature anneal and carburizes the silicon iron, thus producing a material subject to magnetic aging. In this invention, it has been discovered that calcium oxide in the form of a phosphate does not have the tendency to form calcium carbonate in a water slurry so that desulfurization may be obtained. The calcium remains in the glass film. It may thus be stated generally that the additive except for the phosphorus either remains in the glass film or passes harmlessly into the atmosphere.

The previous discussion suggested that the decomposable phosphate compound is applied to the surfaces of the steel, in combination with the magnesium oxide, in the form of a slurry. However, it should be understood that the additive may be applied separately either before or after the application of the magnesia coating, but in any event, prior to the high temperature anneal. For example, one of the preferred methods is to apply the phosphate in the form of phosphoric acid directly to the steel surface. The acid is metered by known methods to control the amount remaining on the steel surface, then dried by the brief application of heat. Subsequent to this the magnesia with or without an additive, is applied thereover.

At this juncture, it may be helpful to illustrate the invention with several examples. However, it should be understood that they are illustrative only and not intended as a limitation thereon.

EXAMPLE I

A commercially processed coil of 12 mil decarburized oriented silicon steel [nominal silicon content 3 percent by weight] was coated with a slurry of magnesium oxide. A second decarburized coil from the same heat was coated with a slurry of magnesium oxide containing $P_2O_5$ [3 percent on a dried coating basis] in the form of calcium phosphate.* In each case the coating weight was approximately 0.030 oz./ft.² sheet. The coated coils were then box annealed in dry hydrogen at 2,200° F. After cooling to room temperature, the excess separator coating was scrubbed from the coil surface.

A microscopic examination of the coils was made and it was found that with the unmodified magnesium oxide coating there was produced a glass film which was smooth but discontinuous. However, in the coil having the 3 percent $P_2O_5$ modified magnesium oxide coating, there was found a smooth, thin, and continuous film of glass.

The magnetic properties of the phosphate modified coated steel were found equal to or superior to the unmodified steel. Finally, the oxidation resistance of the respective coils was determined by heating same in air at about 1,500° F. for 30 minutes. This is a severe test. The unmodified MgO coated coil darkened substantially, indicating less than desirable oxidation resistance. The calcium phosphate treated coil darkened slightly but did show much improved resistance to oxidation.

* supplied as a mono basic calcium phosphate mono hydrate [12 XX] by Stauffer Chemical Company—typical analysis 24.2% P, 16.4% Ca.

EXAMPLE II

In this comparison of coating materials, four strip samples of 11 mil decarburized oriented silicon steel [silicon content 31θ% by weight] were given various coating treatments, then box annealed in dry hydrogen at 2,200° F. The coating treatments were as follows:

| Strip sample | Pretreatment | Separator coating | Coating wt., oz./ft.² |
|---|---|---|---|
| A | 10% $H_3PO_4$ | MgO | .025 |
| B | 10% $H_3PO_4$ | MgO+5%$Cr_2O_3$ | .026 |
| C | 10% $H_3PO_4$ | MgO+2½$P_2O_5$* | .024 |
| D | None | MgO | .027 |

*$P_2O_5$ source, calcium phosphate.

Strip samples A, B and C were prepared by dipping in 150° F. 10 percent phosphoric acid solution for 10 seconds, and passing the strips through grooved wringer rolls to meter the acid remaining on the strip surfaces. These coated strips were then dried at 300° F. for one minute. At this point, each strip was given the separator coating noted above and annealed.

To evaluate the oxidation resistance of each of the glass coated strips, a subsequent anneal was conducted by heating said strips in air at 1,450° F. for 1 hour. The following results were observed:

| Strip Sample | Oxidation Resistance |
|---|---|
| A | slight darkening |
| B | no change |
| C | no change |
| D | severe darkening |

EXAMPLE III

This study was made to evaluate the carburizing resistance of strip samples coated according to the teachings herein. To effect the review, Epstein samples of 11-mil glass coated oriented silicon steel were reannealed in a partially combusted natural gas atmosphere which is potentially carburizing to steels of this type. Any carbon pick up, reflecting a breakdown in the carburizing resistance, can be observed by the changes in the magnetic aging characteristics of the strip samples.

The samples were tested for 15 kilogauss core loss, aged 10 days at 300° F. and retested to evaluate any aging which may have been present prior to the stress relief anneal. The following results indicate that no aging was encountered.

| Sample | Additive with MgO | P15/60 core loss | | |
|---|---|---|---|---|
| | | Before age, watts/lb. | Aged 19 days, watts/lb. | Difference, watts/lb. |
| 1 | A(5% P$_2$O$_5$) | .483 | .484 | .001 |
| 2 | A(10% P$_2$O$_5$) | .478 | .482 | .004 |
| 3 | A(15% P$_2$O$_5$) | .477 | .479 | .002 |
| 4 | B(5% P$_2$P$_5$) | .473 | .477 | .004 |
| 5 | B(10% P$_2$O$_5$) | .479 | .481 | .002 |
| 6 | B(15% P$_2$O$_5$) | .481 | .485 | .004 |
| 7 | C(5% P$_2$O$_5$) | .472 | .476 | .004 |
| 8 | C(10% P$_2$O$_5$) | .476 | .478 | .002 |
| 9 | C(15% P$_2$O$_5$) | .474 | .477 | .003 |

Note.—A = Mg$_3$(PO$_4$)$_2$·8H$_2$O; B = 3Ca$_3$(PO$_4$)$_2$·Ca(OH)$_2$; C = Al(PO$_3$)$_3$.

It was indicated previously that generic names were used to describe the suitable additives for this invention. For convenience, the chemical formulas for some of the compounds falling within the additives contemplated by this invention are as follows:

H$_3$PO$_4$, Ca(H$_2$PO$_4$)2, Ca(H$_2$PO$_4$)$_2$·H$_2$O,
CaHPO$_4$, 3 Ca(PO$_4$)$_2$·Ca(OH)$_2$,
AlPO$_4$, Al(PO$_3$)$_3$, Mg$_3$(PO$_4$)$_2$·8H$_2$O, and
NH$_4$(H$_2$PO$_4$).

It is believed apparent from the preceding discussion and examples that the present invention teaches a novel and economical method of producing a uniform and continuous glass film on silicon steel. As indicated previously, the prior art sought other means than additions to the annealing separator to control the formation of silica. But even in the general area of electrical steels, where phosphates were used in coatings, they were made for different purposes. It was discovered by the present invention that controlled uses of a decomposable phosphate compound could be made to achieve the desired continuous coating.

These phosphate compounds, depending on the compounds selected, are reduced at about 1,650° to 1,800° F. during the high-temperature secondary-recrystallization anneal which may reach about 2,300° F. Prior art attempts to utilize phosphorous bearing compounds for insulative coatings were generally of the nature of a water soluble coating applied subsequent to the scrubbing operation which follows the high-temperature anneal. Use of phosphates for separator coatings has generally been limited to nonoriented grades where the anneal to develop magnetic properties is conducted at maximum heating temperatures well below the annealing range of 1,800°–2,300° F. Without the reduction of the phosphorous bearing compound, the reaction or coaction with the steel is totally different. Thus, while decomposable phosphate compounds are known per se in the electrical steel art, no one has recognized the unique ability of the compounds to control the formation of silica during the high temperature box anneal of oriented grades.

Since it may become apparent to those skilled in the art that modifications may be made in this invention without departing from the scope thereof, no limitation is intended to be imposed herein except as set forth in the following claims.

We claim:

1. A method of producing an insulating glass coating on the surface of silicon-iron steel stock subjected to a high-temperature anneal, comprising the steps of coating said stock with magnesium oxide and a decomposable phosphate compound, said decomposable phosphate compound being present in such an amount to yield from about 1 percent to about 25 percent P$_2$O$_5$, by weight, of the coating and annealing said stock at a temperature to reduce said phosphate compound and form a uniform magnesium silicate glass film on said annealed stock.

2. The method claimed in claim 1 wherein said magnesium oxide and decomposable phosphate compound is applied as an aqueous mixture and dried in situ prior to said anneal.

3. The method claimed in claim 1, wherein said decomposable phosphate compound is present in such an amount as to yield from 1–15% P$_2$O$_5$, by weight, of the coating.

4. The method claimed in claim 1, wherein said decomposable phosphate compound is selected from the group consisting of phosphoric acid, calcium phosphate, aluminum phosphate, magnesium phosphate, and ammonium phosphate.

5. The method claimed in claim 4 wherein said decomposable phosphate compound is a calcium phosphate selected from the compounds whose chemical formulas are as follows: Ca(H$_2$PO$_4$)$_2$, Ca(H$_2$PO$_4$)$_2$·H$_2$O, CaHPO$_4$, and 3 Ca(PO$_2$)·Ca(OH)$_2$.

6. The method claimed in claim 4 wherein said decomposable phosphate compound is an aluminum phosphate selected from the compounds whose chemical formulas are as follows: AlPO$_4$ and Al(PO$_3$)$_3$.

7. The method claimed in claim 1 wherein at least a portion of said decomposable phosphate compound is applied prior to said magnesium oxide.

8. The method claimed in claim 7 wherein said decomposable phosphate compound is phosphoric acid.

* * * *